(No Model.)
A. SCHLAPBACH.
LEMON SQUEEZER.
No. 258,812. Patented May 30, 1882.
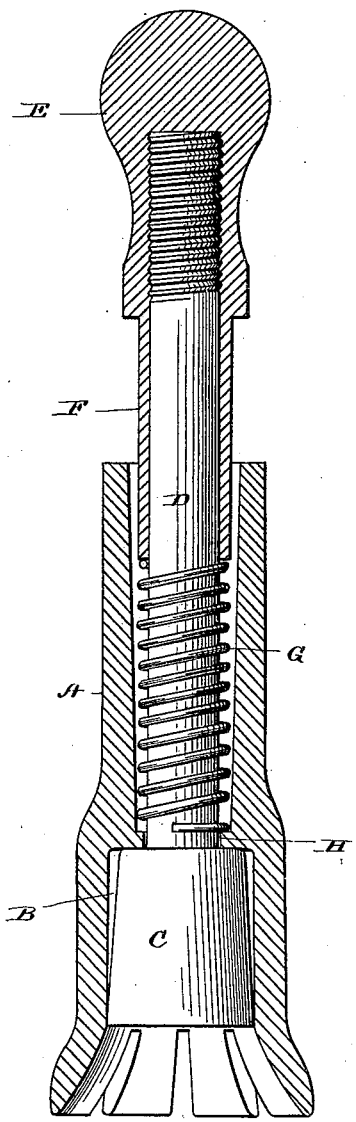

United States Patent Office.

ALBERT SCHLAPBACH, OF SCANDIA, KANSAS.

LEMON-SQUEEZER.

SPECIFICATION forming part of Letters Patent No. 258,812, dated May 30, 1882.

Application filed April 19, 1882. (No model.)

*To all whom it may concern:*

Be it known that I, ALBERT SCHLAPBACH, of Scandia, in the county of Republic, and in the State of Kansas, have invented certain new and useful Improvements in Lemon-Squeezers; and I do hereby declare that the following is a full, clear, and exact description thereof, reference being had to the accompanying drawing, and to the letters of reference marked thereon, making a part of this specification.

This invention has for its objects to provide an improved lemon-squeezer or hand-press for expressing the juice of fruits and separating it from the pulpy portions, and also for cracking nuts, mashing potatoes, &c., as more fully hereinafter specified. These objects I accomplish by the device illustrated in the accompanying drawing, in which is illustrated a sectional view of my invention.

The letter A indicates a tube of suitable material, having its lower portion enlarged, the mouth or opening of said lower portion being made flaring or bell-shaped, so as to set over the fruit, nuts, &c., as the case may be, the sides of said lower portion being slotted, as indicated, for the escape of the expressed fruit-juice. The lower or enlarged portion of the tube forms a chamber, B, in which is located a plunger, C, at the lower end of a longitudinally-movable rod, D, which extends up through the tube, as indicated, the upper end being screw-threaded, and having secured to it a handle, E, which is formed with a sleeve, F, extending down over the shaft, forming a bearing for the upper end of the spiral spring G, which surrounds the rod D, the lower end resting against a shoulder, H, on the interior of the tube, so as to hold the rod and plunger normally elevated.

The operation of my invention is as follows: The fruit is placed in a suitable vessel, and the flaring end of the apparatus is placed over it. The plunger is then depressed, squeezing and expressing the juice, which passes through the slots. The handle and sleeve being readily detachable, as is evident, it will be perceived that the plunger-rod and spring may be readily removed for cleaning or other purposes when required. The spiral spring serves not only to hold the plunger normally elevated, but also to transmit the initial pressure on the handle to the tube below, and divide to a certain degree the force applied from the handle to the tube and plunger at the same time, in order that the tube may hold the fruit to be pressed more firmly and steadily.

Having thus described my invention, what I claim, and desire to secure by Letters Patent, is—

The herein-described hand-press or fruit-squeezer, consisting of a tube having an enlarged chamber and flaring slotted mouth at its lower end, and provided with a plunger and rod having a detachable handle, and a spiral spring for holding the plunger normally elevated, substantially as and for the purposes specified.

In testimony that I claim the foregoing I have hereunto set my hand this 30th day of March, 1882.

ALBERT SCHLAPBACH.

Witnesses:
 J. J. MCCARTHY,
 A. B. WILDER.